United States Patent
Huang et al.

(10) Patent No.: US 10,924,893 B2
(45) Date of Patent: Feb. 16, 2021

(54) GROUP MESSAGE DELIVERY USING MULTICAST

(71) Applicant: Verizon Patent and Licensing Inc., Arlington, VA (US)

(72) Inventors: Ye Huang, San Ramon, CA (US); Sudhakar Reddy Patil, Flower Mound, TX (US); Arda Aksu, Lafayette, CA (US); Riyaj Uddin Ahmed, Coppell, TX (US); Niranjan B. Avula, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/385,687

(22) Filed: Apr. 16, 2019

(65) Prior Publication Data
US 2020/0336864 A1    Oct. 22, 2020

(51) Int. Cl.
*H04W 4/08* (2009.01)
*H04W 76/11* (2018.01)
*H04W 8/08* (2009.01)
*H04W 8/22* (2009.01)
*H04W 4/12* (2009.01)

(52) U.S. Cl.
CPC .............. *H04W 4/08* (2013.01); *H04W 4/12* (2013.01); *H04W 8/08* (2013.01); *H04W 8/22* (2013.01); *H04W 76/11* (2018.02)

(58) Field of Classification Search
CPC ........... H04W 4/08; H04W 8/22; H04W 4/12; H04W 8/08; H04W 76/11
See application file for complete search history.

(56) References Cited

U.S. PATENT DOCUMENTS

| | | | |
|---|---|---|---|
| 2012/0106391 A1* | 5/2012 | van Loon | H04L 12/1886 370/252 |
| 2015/0358816 A1* | 12/2015 | Zhang | H04W 12/06 726/12 |
| 2016/0007138 A1* | 1/2016 | Palanisamy | H04W 4/50 455/41.2 |
| 2018/0035327 A1* | 2/2018 | Huang | H04W 4/70 |
| 2018/0054765 A1* | 2/2018 | Kim | H04W 4/70 |
| 2018/0279090 A1* | 9/2018 | Hirata | H04W 4/06 |
| 2019/0261260 A1* | 8/2019 | Dao | H04W 8/08 |

* cited by examiner

*Primary Examiner* — Steven H Nguyen

(57) ABSTRACT

A device may obtain, for an account associated with a user equipment (UE) that is connected to a network, subscriber profile data that includes a group identifier for a messaging group for UEs that are eligible to utilize a group messaging service. The device may update a data structure to associate the group identifier and a UE identifier for the UE, wherein the data structure also associates the group identifier and other UE identifiers for other UEs of the messaging group. The device may receive, based on being subscribed to the group messaging service, group message data for a group message. The device may select the UE and the one or more other UEs as target recipients of the group message and may provide, using multicast, the contents of the group message to the UE and the one or more other UEs.

20 Claims, 8 Drawing Sheets

GROUP MESSAGE DELIVERY USING MULTICAST

BACKGROUND

A message may be transmitted over a network using a data transmission technique. For example, a message may be transmitted over a network using a unicast technique, a multicast technique, and/or the like.

DETAILED DESCRIPTION OF PREFERRED EMBODIMENTS

Figure 1A:
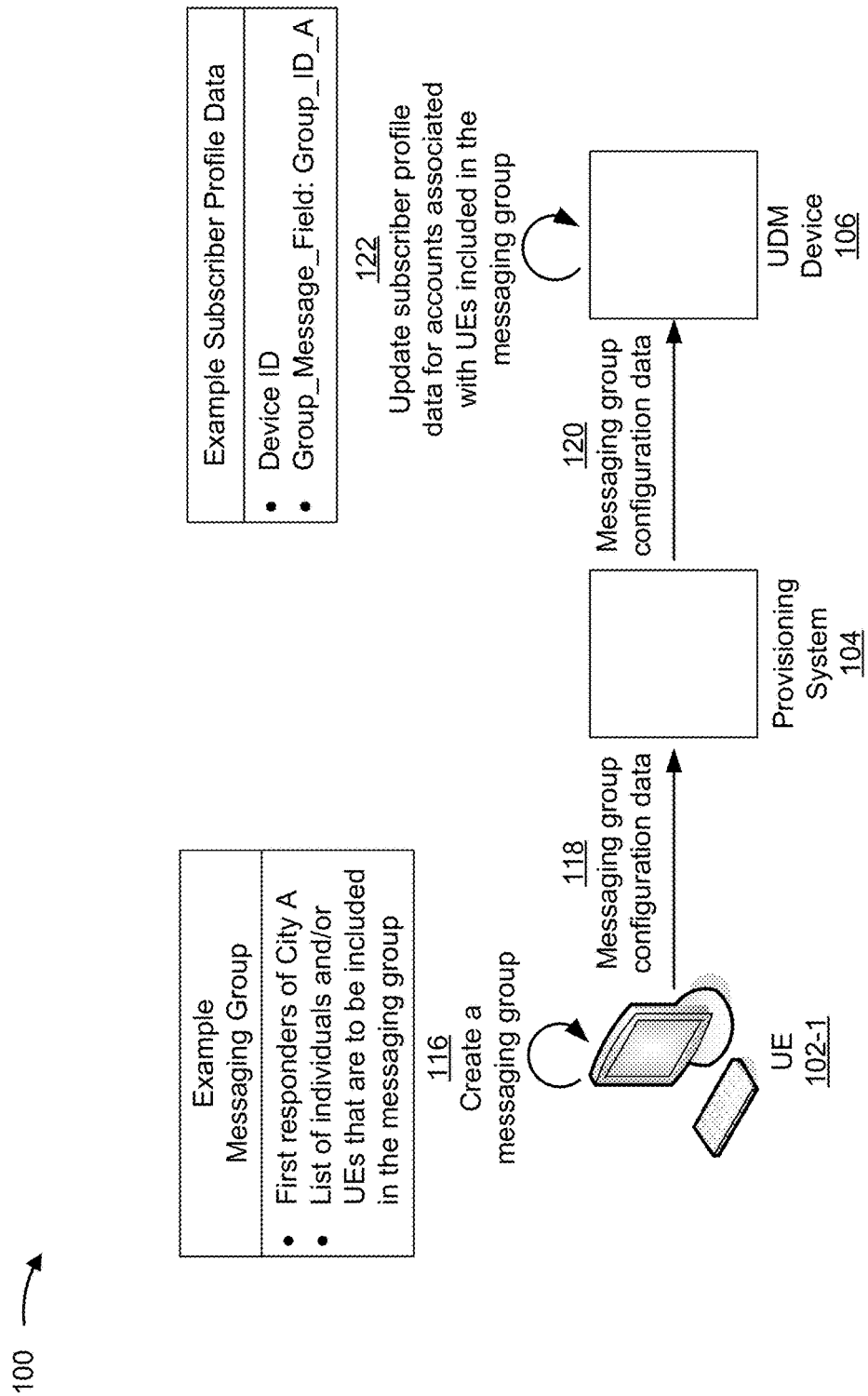
FIGS. 1A-1D are diagrams of one or more example implementations described herein.

The following detailed description of example implementations refers to the accompanying drawings. The same reference numbers in different drawings may identify the same or similar elements.

A network may support a group messaging service that allows a group message to be provided to a set of user equipment (UEs) (e.g., mobile devices, internet of things (IoT) devices, and/or the like). For example, an event may occur which may cause undue hardship to individuals located in a geographic area impacted by the event (i.e., an impact area). In this case, the group messaging service may be used to provide a group message to first responders, to provide a group message to individuals in the impact area of the event, and/or the like. Additionally, or alternatively, the group messaging service may have one or more other purposes. For example, the group messaging service may permit an individual to send a group message (e.g., a group short message service (SMS) message) to a group of individuals. To provide a few specific examples, a manager of an organization may use the group messaging service to provide a group message to a group of employees, a teacher may use the group messaging service to provide a group message to a group of students, and/or the like.

In some cases, a group messaging service may be supported by a fourth generation (4G) long term evolution (LTE) network. This procedure uses a unicast transmission technique to transmit separate copies of the group message to one or more downstream network devices (e.g., one or more mobility management entities (MMEs)) and eventually to the set of UEs.

However, transmitting separate copies of the group message to one or more downstream network devices causes latency issues, reduces quality of service (QoS) in message transmission, increases network traffic and creates an inefficient solution that is difficult to scale (e.g., because overhead of network resources is linked to a quantity of UEs receiving the group message). For example, if a group message is to be provided to 5,000 UEs, the SCEF may need to generate and/or transmit 5,000 individual messages to one or more MMES that serve an area targeted for the group message, which requires the one or more MMES to transmit the 5,000 individual group messages to the 5,000 UEs (e.g., via serving base stations). This wastes processing resources, network resources, and/or memory resources of devices that must generate, transmit, and/or receive thousands of individual messages.

Some implementations described herein provide for a method that allows a single group message to be provided to an access and mobility management function (AMF) device, such that the AMF device may perform a multicast transmission technique to provide the group message to a set of UEs. For example, a user may interact with an interface of a group messaging service to create a messaging group. When the user creates the messaging group, a group identifier for the messaging group and device identifiers for a set of UEs that are included in the messaging group may be provided to a unified data management (UDM) device. This may cause the UDM device to integrate the group identifier into subscriber profiles of users associated with the set of UEs.

Additionally, as a UE, of the set of UEs, connects to the network, the AMF device may obtain subscriber profile data for the UE which includes the group identifier for the messaging group. In this case, the AMF device may update a data structure to associate a device identifier for the UE and the group identifier for the messaging group. Additionally, the AMF device may subscribe to the messaging group by interacting with a network repository function (NRF). One or more additional UEs, of the set of UEs, may connect to the network over time.

Furthermore, when a group message is created, group message data for the group message may be generated by a network exposure function (NEF) and provided to the NRF. This may cause the NRF to provide the group message data to the AMF device. The group message data may be provided as a single message (and not as individual messages that correspond to each UE). When the AMF device receives the group message data, the AMF device may select a UE and the one or more additional UEs as target recipients for the group message and may use the multicast transmission technique to provide the group message to the UE and to the one or more additional UEs. Some implementations described herein also provide a 4G solution, as will be described further herein.

By using a connection procedure to determine which UEs are part of the messaging group, and configuring the AMF device to subscribe to the NRF when at least one UE, of the set of UEs, is connected to the network, the group message data may be provided to the AMF device as a single message, thereby allowing the AMF device to use a multicast transmission technique to transmit the group message to the UE and to the one or more additional UEs. This conserves resources (e.g., processing resources, network resources, memory resources, and/or the like) relative to techniques that must transmit individual group messages to the AMF device. Additionally, by implementing a solution that causes the group message data to be transmitted to the AMF device as a single message, the solution is scalable and able to efficiently and effectively service messaging groups that include large numbers of UEs. Furthermore, by significantly reducing a volume of messages transmitted over the network, more resources are available for other transmissions, thereby reducing overall network latency, improving quality of service (QoS), and/or the like.

FIGS. 1A-1D are diagrams of one or more example implementations 100 described herein. Example implementation(s) 100 may include a UE 102-1, a provisioning system 104, a unified data management (UDM) device 106, a group of user equipment (UEs) 102 (shown as UE 102-1, UE 102-2, and other UEs 102), a base station, an access and mobility management function (AMF) device 110-1, a network exposure function (NEF) device 112, and a network repository function (NRF) device 114.

As shown in FIGS. 1A-1D, AMF device 110-1 may receive group message data that includes contents of a group message that is to be provided to a set of UEs 102 and may use a multicast transmission technique to provide the contents of the group message to a subset of the UEs 102 that are presently connected to a network. As shown, the network may be a fifth generation (5G) network, such as a 5G network that uses a service-based architecture (SBA). While one or more implementations described herein use a 5G network, it is to be understood that this is provided by way of example. In practice, one or more implementations described herein may be implemented using a different type of network, such as a fourth generation (4G) network, a third generation (3G) network, and/or the like.

As shown in FIG. 1A, and by reference number 116, UE 102-1 may create a messaging group. For example, a user may access UE 102-1 to interact with an interface of a group messaging service (e.g., a service supported by an application or a website) that allows users to create messaging groups and to create group messages that may be transmitted to members of the messaging groups. A messaging group may include a set of UEs that are members of the messaging group and that are eligible to receive group messages associated with the messaging group.

To create the messaging group, the user may interact with the interface to input a group name, a description of the messaging group, and/or a list of members that are to be included in the messaging group. The members may be identified using device identifiers of UEs, profile identifiers of subscriber profiles associated with the UEs, user identifiers of individuals (e.g., names of individuals, etc.) that are authorized users of the subscriber profiles, an enterprise identifier associated with an enterprise or a group within the enterprise that is permitted to send group messages, and/or the like. For example, the user may input specific names or phone numbers of individuals that are to be included in the messaging group. Additionally, or alternatively, and provided as another example, the user may upload a document that includes the list of individuals and/or UEs that are to be included in the messaging group.

The group messaging service may support a number of different types of messaging groups. For example, the group messaging service may support messaging groups relating to disaster relief (e.g., a messaging group that includes first responders in an area impacted by a disaster, a messaging group that includes all individuals in the area impacted by the disaster, and/or the like), messaging groups for an organization (e.g., a messaging group for employees in a specific department, a messaging group for a specific team or committee, and/or the like), messaging groups for an individual (e.g., a messaging group for a teacher to relay messages to a group of students), a messaging group for a specific set of IoT devices, and/or the like.

When UE 102-1 creates the messaging group, as shown by reference number 118, messaging group configuration data may be provided to provisioning system 104. For example, when UE 102-1 creates the messaging group, an application programming interface (API) or another type of communication interface may be used to provide the messaging group configuration data to provisioning system 104. The messaging group configuration data may include the group identifier for the messaging group, the list of individuals and/or UEs that are to be included in the messaging group, and/or the like.

As shown by reference number 120, provisioning system 104 may provide the messaging group configuration data to UDM device 106. For example, provisioning system 104 may use an API or another type of communication interface to provide the messaging group configuration data to UDM device 106. This may allow UDM device 106 to update subscriber profiles based on the messaging group configuration data, as described below.

As shown by reference number 122, UDM device 106 may update subscriber profile data for subscriber profiles associated with the set of UEs that are included in the messaging group. For example, UDM device 106 may process a list of device identifiers included in the messaging group data and may use the device identifiers to identify subscriber profiles associated with the set of UEs. This may allow UDM device 106 to update a field of the subscriber profiles to store the group identifier for the messaging group that has been created.

To provide a specific example, UDM device 106 may process the messaging configuration data to identify a device identifier for a particular UE 102. In this example, UDM device 106 may perform a search query to search one or more data structures to identify a subscriber profile that corresponds to the device identifier. This may allow UDM device 106 to update a field of the subscriber profile to include the group identifier for the messaging group.

Additionally, or alternatively, UDM device 106 may associate the group identifier with a device identifier for a particular UE 102 that is connected to and/or part of another network. For example, UDM device 106 may receive messaging group configuration data for a particular UE 102 that is associated with a different network than the network that UDM device 106 is servicing. In this case, UDM device 106 may associate a device identifier corresponding to the particular UE 102 with the group identifier for the messaging group (e.g., by using a data structure to store the device identifier in association with the group identifier).

In some implementations, UDM device 106 may have to do additional processing to identify a subscriber profile to update. For example, in some cases, rather than provide a list of UEs that are to be included in the messaging group, UE 102-1 may provide location data for a geographic area. As a specific example, the messaging group may be for a particular geographic area that is susceptible to hurricanes, and, rather than include a complete list of UEs within the particular geographic area, UE 102-1 may provide coordinates for the geographic area. UDM device 106 may use the coordinates to search billing information to identify a first set of UEs that are linked to subscriber profiles with billing zip codes that are within the geographic area. This may allow UDM device 106 to update the subscriber profiles with the group identifier.

In some implementations (not shown), when the messaging group is created, the messaging group may be registered with a resource of the network. For example, when the messaging group is created, an API may be used to provide the group message configuration data to NEF device 112. This may cause NEF device 112 to register the messaging group with NRF device 114 (such that AMF devices 110 are able to subscribe to the messaging group, as described further herein).

In this way, subscriber profiles associated with UEs that are included in the messaging group may be updated to include the group identifier.

Figure 1B:
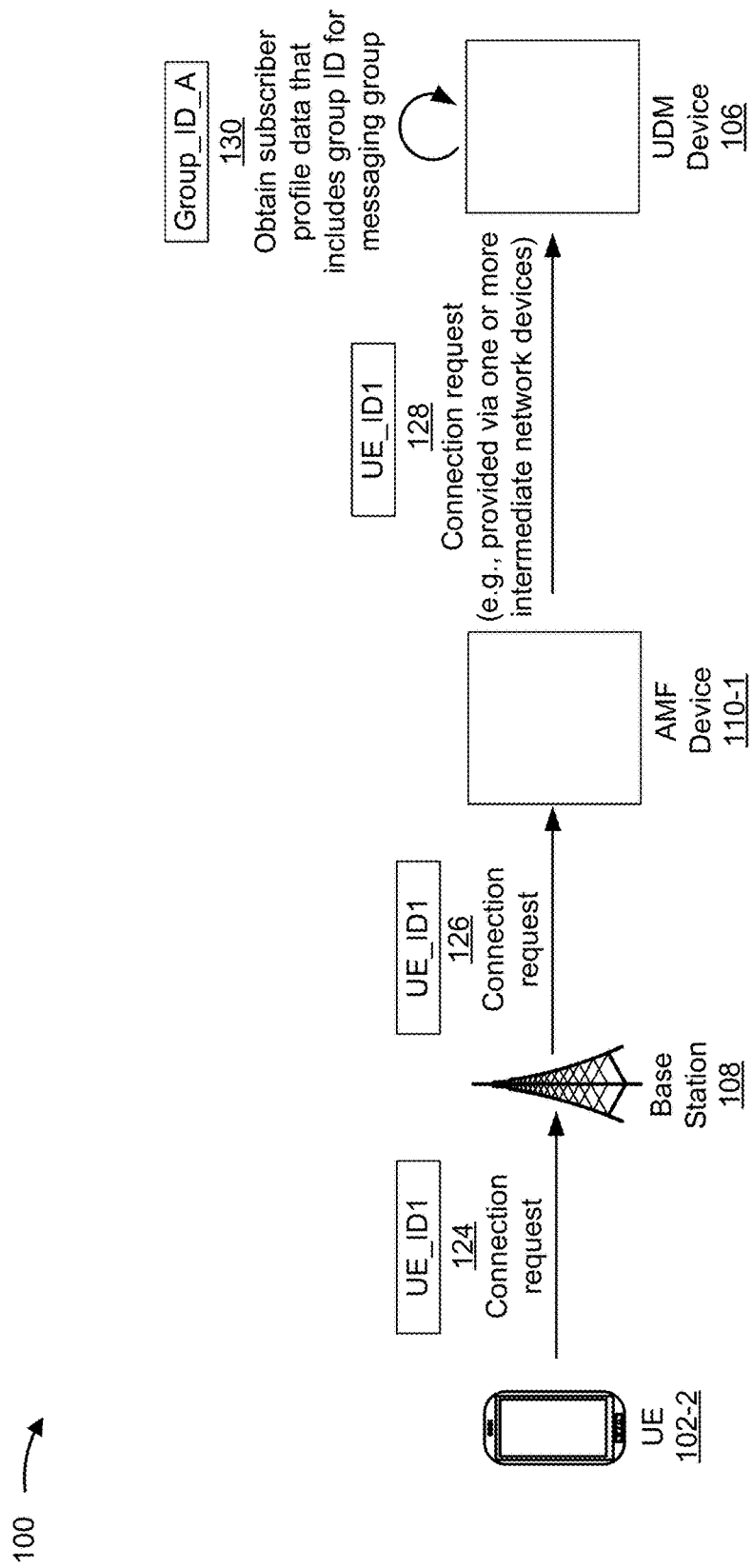
Figure 1C:
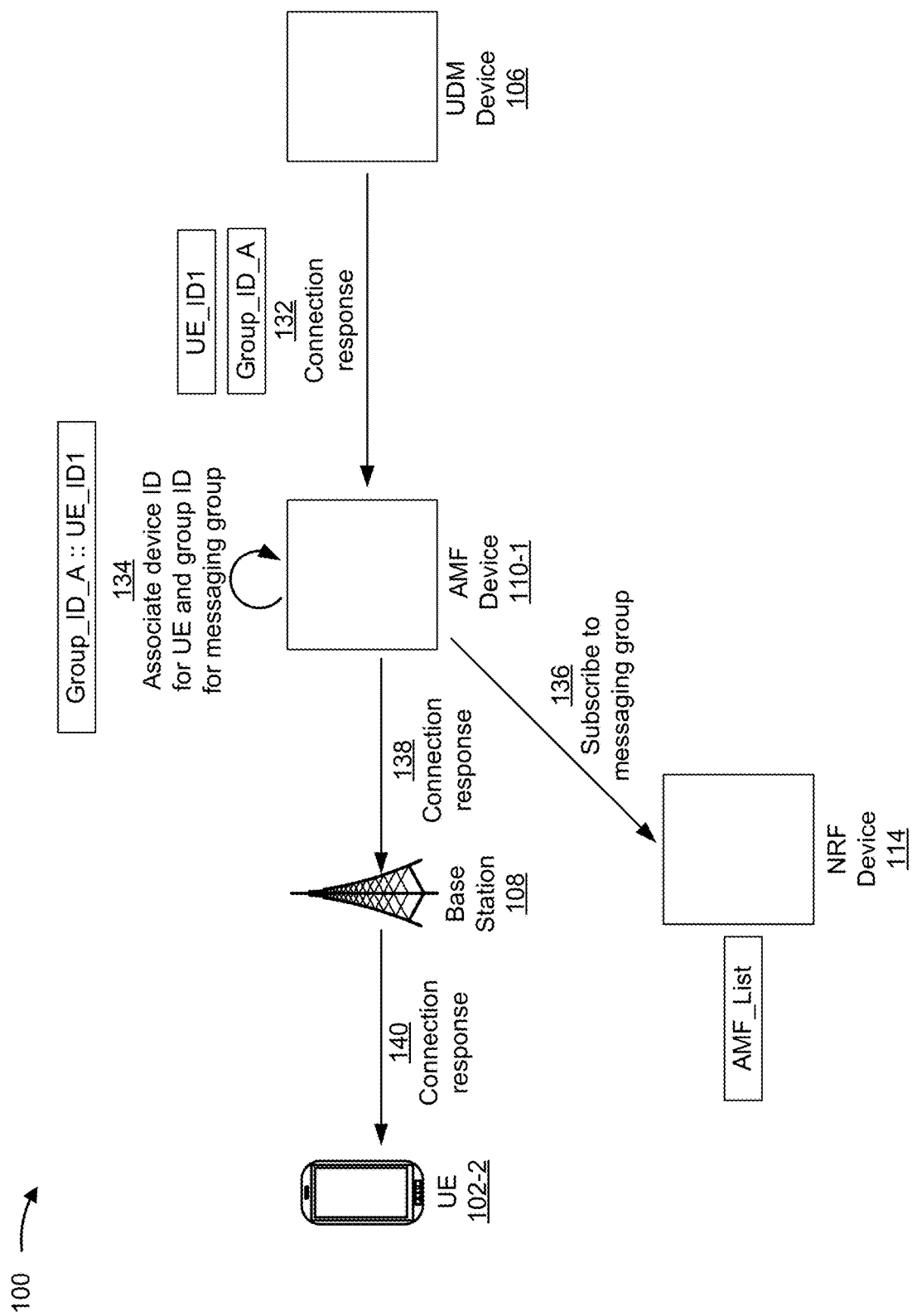

As shown in FIGS. 1B and 1C, when UE 102-2 connects to the network, AMF device 110-1 may identify that UE 102-2 is part of the messaging group and may subscribe to messaging group, such that new group messages for the messaging group are broadcast to AMF device 110-1 (e.g., which may permit AMF device 110-1 to transmit the new group messages to UE 102-2).

As shown in FIG. 1B, and by reference number 124, UE 102-2 may provide a connection request to base station 108. For example, UE 102-2 may enter a coverage area of base station 108 and may provide a connection request to base station 108 based on UE 102-2 powering on, returning from an idle state, enabling a network connection feature, moving into range of base station 108, and/or a similar type of trigger. The connection request may include device information of UE 102-2, such as a device identifier (e.g., an international mobile equipment identity (IMEI) number, an international mobile subscriber identity (IMSI) number, a mobile subscriber mobile station international (MSISDN) number, a unique device identifier (UDID), etc.) and/or other information that may be used to establish a connection with the network.

As shown by reference number 126, base station 108 may provide the connection request to AMF device 110-1. As shown by reference number 128, AMF device 110-1 may provide the connection request to UDM device 106 (e.g., via one or more intermediate network devices). For example, AMF device 110-1 may provide the connection request to a session management function (SMF) device (not shown), which may provide the connection request to a policy control function (PCF) device (not shown), which may provide the connection request to UDM device 106.

As shown by reference number 130, UDM device 106 may obtain subscriber profile data for UE 102-2. For example, UDM device 106 may use the device identifier of UE 102-2, which is included in the connection request, to obtain subscriber profile data for a subscriber profile associated with UE 102-2 and that includes the group identifier for the messaging group. Additionally, UDM device 106 may include the group identifier as part of a connection response.

In this way, UDM device 106 obtains subscriber profile data that includes the group identifier that indicates that UE 102-2 is included in the messaging group.

As shown in FIG. 1C, and by reference number 132, UDM device 106 may provide, to AMF device 110-1, the connection response that includes the group identifier for the messaging group. For example, UDM device 106 may provide the connection response to AMF device 110-1 via the one or more intermediary network devices.

As shown by reference number 134, AMF device 110-1 may associate the device identifier for UE 102-2 and the group identifier for the messaging group. For example, AMF device 110-1 may update a data structure such that the device identifier for UE 102-2 is stored in association with the group identifier for the messaging group. By updating the data structure, AMF device 110-1 is able to create a local record (e.g., which may be kept for a threshold duration after UE 102-2's session ends) indicating that UE 102-2 is part of the messaging group. The local record may be referenced later and used to select UE 102-2 as a target recipient for a particular group message, as described further herein.

As shown by reference number 136, AMF device 110-1 may subscribe to the messaging group. For example, AMF device 110-1 may subscribe to the messaging group by providing, to NRF device 114, a message or an instruction that indicates that AMF device 110-1 is to receive group messages that are distributed as part of the messaging group. The message or instruction may include the group identifier, which may allow NRF device 114 to update a list of AMF devices 112 that are to receive group messages that are distributed as part of the messaging group.

In some implementations, AMF device 110-1 may subscribe to the messaging group when a first UE 102 (e.g., UE 102-2), of the set of UEs 102 that are included in the messaging group, connects to the network. For example, there may be no reason for AMF device 110-1 to subscribe to the messaging group if AMF device 110-1 is not serving at least one UE 102 that is included in the messaging group. As such, AMF device 110-1 may use the first UE 102 as a trigger to subscribe to the messaging group. Additionally, or alternatively, AMF device 110-1 may subscribe to the messaging group based on another trigger. For example, AMF device 110-1 may receive instructions to subscribe to the messaging group from another device. In this case, after the messaging group is created, a network device (e.g., NEF device 14, NRF device 114, and/or the like) may provide, to AMF device 110-1, instructions to subscribe to the messaging group.

As shown by reference number 138, AMF device 110-1 may provide the connection response to base station 108. As shown by reference number 140, base station 108 may provide the connection response to UE 102-2, which may alert UE 102-2 that a connection to the network has been established.

While the example described herein illustrates UE 102-2 connecting to the network, it is to be understood that one or more other UEs 102 (e.g., that are part of the messaging group) may already be connected to the network. Additionally, or alternatively, one or more other UEs 102 may connect to the network after UE 102-2.

In this way, AMF device 110-1 uses the connection procedure for UE 102-2 to identify that UE 102-2 is included in the messaging group.

Figure 1D:
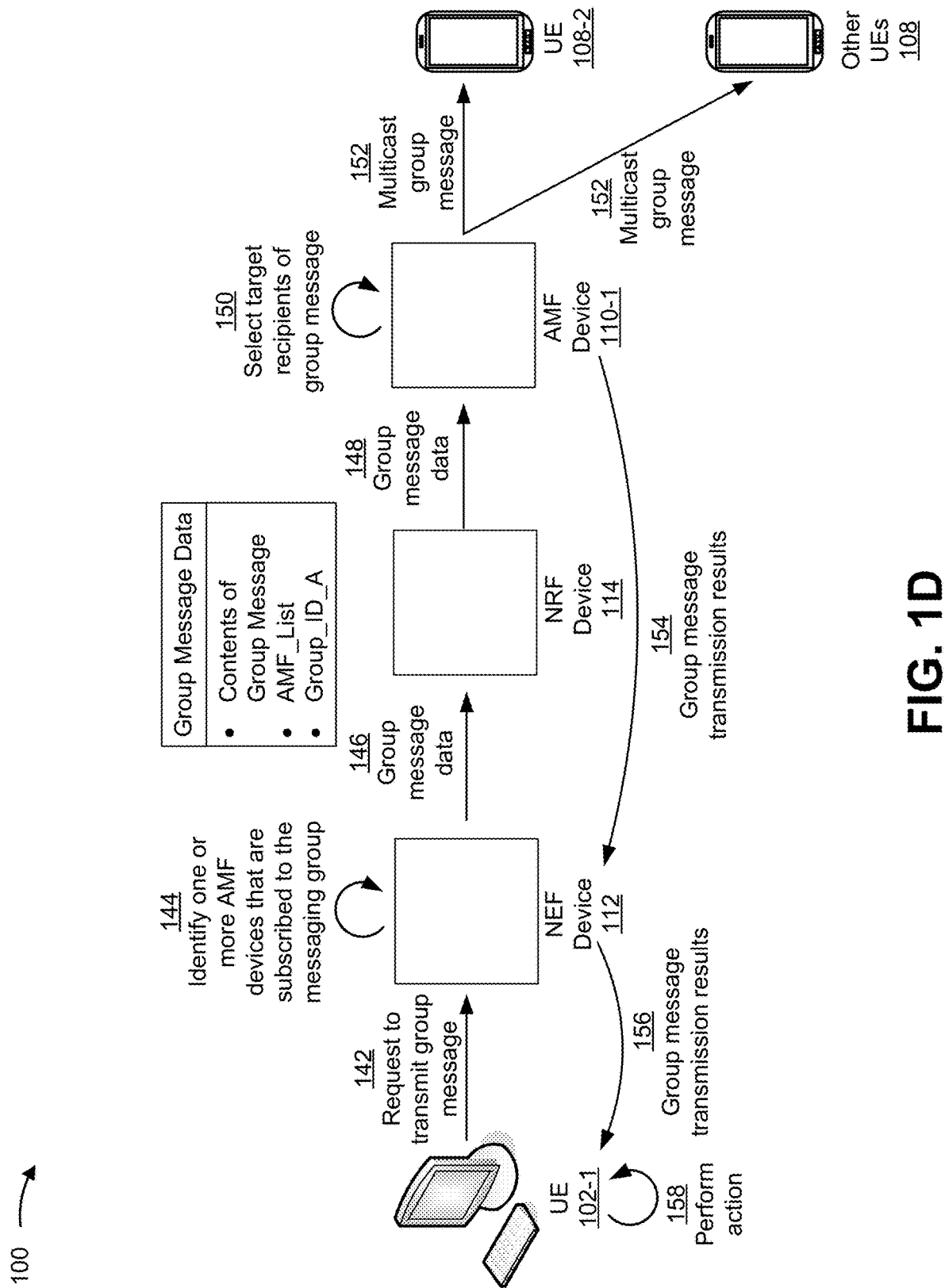

As shown in FIG. 1D, and by reference number 142, UE 102-1 may provide, to NEF device 112, a request to transmit a group message. For example, a user that has permission to create group messages may interact with an interface of UE 102-1 to create a request to transmit a group message. The request may be provided to NEF device 112 via a communication interface, such as an API that has been created for the group messaging service or another type of communication interface.

The request may include contents of the group message, the group identifier, location data if the group message is to be provided to a specific geographic area, and/or the like. The contents of the group message, as discussed elsewhere herein, may include information used to alert individuals of an event (e.g., a natural disaster), used to provide support for disaster relief, used to provide instruction or a notification to a group of employees of an organization, and/or the like.

As shown by reference number 144, NEF device 112 may identify one or more AMF devices 112 that are subscribed to the messaging group. For example, NEF device 112 may process the request to identify the group identifier for the messaging group and may use the group identifier to search a data structure for the list of AMF devices 112 that are subscribed to the messaging group (e.g., which may include AMF device 110-1).

As shown by reference number 146, the NEF device 112 may provide group message data to NRF device 114. For example, NEF device 112 may provide group message data that serves as an indicator that the group message has been created and is to be transmitted to the set of UEs 102 that are included in the messaging group. The group message data may include the contents of the group message, the list of AMF devices 112 that are subscribed to the messaging group (e.g., a list of identifiers for AMF devices 112), the group identifier, and/or any other data that may assist in transmitting the group message.

As shown by reference number 148, NRF device 114 may provide the group message data to AMF device 110-1. In some cases, NRF device 114 may remove the AMF list from the group message data before providing the group message data to AMF device 110-1. By providing the group message data to AMF device 110-1 via a single message, processing resources and/or network resources (e.g., of AMF device 110-1, NEF device 112, NRF device 114, etc.) are conserved relative to a solution that must generate, transmit, and/or receive individual group messages for each UE 102 that is included in the messaging group.

As shown by reference number 150, AMF device 110-1 may select target recipients of the group message. For example, AMF device 110-1 may select UE 102-2 and one or more other UEs 102 that are connected to the network via AMF device 110-1. In this case, AMF device 110-1 may process the group message data to identify the group identifier and may use the group identifier to search the data structure for device identifiers that are stored in association with the group identifier. If a device identifier is stored in association with the group identifier, AMF device 110-1 may select a particular UE 102 associated with the device identifier as a target recipient of the group message.

As shown by reference number 152, AMF device 110-1 may perform a multicast transmission technique to transmit the group message to UE 102-2 and the one or more other UEs 102 (collectively referred to as recipient UEs 102). For example, AMF device 110-1 may perform a multicast transmission technique to transmit the group message to a service area associated with AMF device 110-1 in a manner that is accessible to the recipient UEs 102.

In some implementations, performing the multicast transmission technique may include establishing a multicast session with a recipient UE 102. For example, AMF device 110-1 may provide multicast instructions to the recipient UE 102 that includes an instruction that indicates a time at which the multicast session will be available, a location at which the recipient UE 102 may access the multicast session, a location at which to obtain the group message (e.g., a uniform resource locator (URL) that indicates where to download the group message), and/or the like. In this case, the recipient UE 102 may, based on the multicast instructions, perform one or more actions that permit the recipient UE 102 to obtain the group message.

Additionally, or alternatively, performing the multicast transmission technique may include providing the group message directly to the recipient UEs 102. In one or more of these implementations, performing the multicast transmission technique may include encrypting data. For example, AMF device 110-1 may encrypt a storage location identifier of the multicast instructions that are provided to the recipient UE 102, and the recipient UE 102 may decrypt the storage location identifier to determine a location at which to download the group message. As another example, AMF device 110-1 may encrypt the group message that is provided directly to the recipient UE 102 and the recipient UE 102 may decrypt the group message.

As shown by reference number 154, AMF device 110-1 may provide group message transmission results to NEF device 112. For example, AMF device 110-1 may generate group message transmission results that indicate a quantity of UEs 102, of the set of UEs 102 that are included in the messaging group, that received the group message. Additionally, or alternatively, AMF device 110-1 may generate group message transmission results that indicate, of a total number (quantity) of transmissions, a number of successful transmissions of the group message. In some implementations, AMF device 110-1 may wait a threshold time period and may generate group message transmission results of transmissions that have occurred over the threshold time period. In these cases, the group message transmission results may be provided to NEF device 112.

As shown by reference number 156, NEF device 112 may provide the group message transmission results to UE 102-1. As shown by reference number 158, UE 102-1 may perform one or more actions based on receiving the group message transmission results. For example, UE 102-1 may provide the group message transmission results for display via an interface (e.g., an interface of the application or website supporting the group messaging service).

Additionally, or alternatively, and as another example, UE 102-1 may store the group message transmission results as a record that measures an effectiveness level of the group message. Additionally, or alternatively, and as another example, UE 102-1 may generate and provide follow-up information to a particular UE 102. For example, if a member of an organization sends a group message to a set of UEs 102 associated with other members in a particular department, the group message transmission results may alert the sender that one or more other members did not receive the group message. In this case, the sender may interact with UE 102-1 (or another device) to perform one or more actions that make the group message available to the one or more other members via another means. For example, the sender may access UE 102-1 to provide the group message to an electronic mail (e-mail) account of the member, to provide the group message to a personal device of the member (which may not have been included in the messaging group), and/or the like.

By using the connection procedure to determine which UEs 102 are part of the messaging group, and by subscribing to the messaging group via NRF device 114, a single message that includes the group message data may be provided to AMF device 110-1, thereby allowing AMF device 110-1 to use a multicast transmission technique to transmit the group message to recipient UEs 102. This conserves resources (e.g., processing resources, network resources, memory resources, and/or the like) by eliminating a need to transmit individual group messages for each recipient UE 102 to one or more network devices (e.g., from NEF device 112 to NRF device 114, from NRF device 114 to AMF device 110-1, etc.) before providing the group message to the recipient UEs 102.

As indicated above, FIGS. 1A-1D are provided as one or more examples. Other examples may differ from what is described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
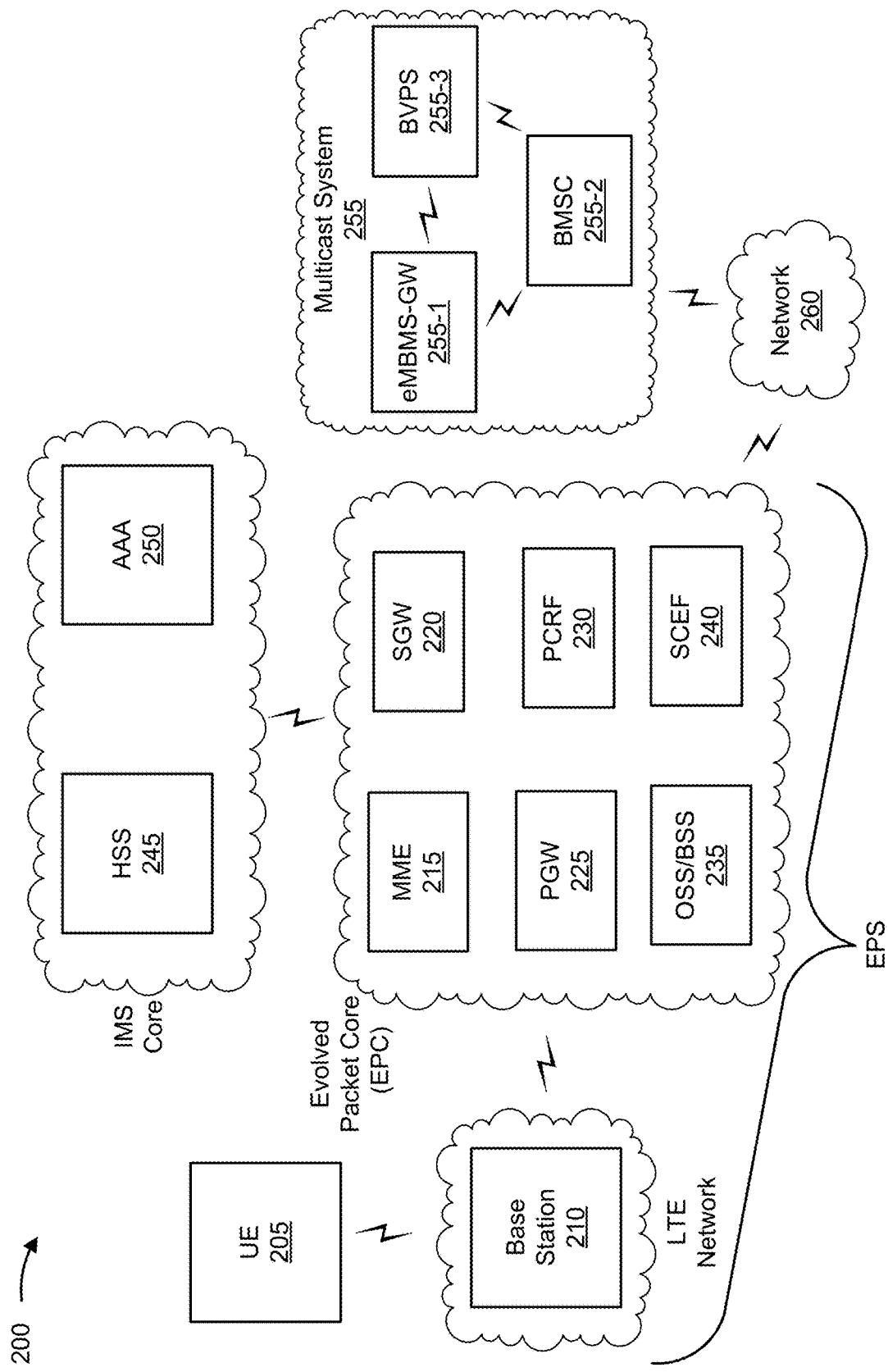
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user equipment (UE) 205, a base station 210, a mobility management entity (MME) 215, a serving gateway (SGW) 220, a packet data network gateway (PGW) 225, a policy and charging rules function (PCRF) 230, an operations support system/business support systems (OSS/BSS) 235, a service capability exposure function (SCEF) 240, a home subscriber server (HSS) 245, an authentication, authorization, and accounting server (AAA) 250, a multicast system 255 that includes an evolved Multimedia Broadcast/Multicast Service Gateway (eMBMS-GW) 255-1, a Broadcast-Multicast Service Center (BMSC) 255-2, and/or a broadcast video provisioning system (BVPS) 255-3, and/or a network 260. Devices of environment 200 may interconnect via wired connections, wireless connections, or a combination of wired and wireless connections.

Some implementations are described herein as being performed within a 5G network for explanatory purposes. In practice, one or more of these implementations may be performed within a 4G network, such as a 4G LTE network, as shown in FIG. 2. Additionally, one or more implementations may be performed within another type of network (not shown), such as a third generation (3G) network or another type of network.

Environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, and/or PGW 225 that enable UE 205 to communicate with network 260 and/or an Internet protocol (IP) multimedia subsystem (IMS) core. The IMS core may include HSS 245 and/or AAA 250, and may manage device registration and authentication, session initiation, etc., associated with UE 205. HSS 245 and/or AAA 250 may reside in the EPC and/or the IMS core. Additionally, or alternatively, the EPC may include OSS/BSS 235 and/or SCEF 240 to enable UE 205 to access one or more group messaging services.

UE 205 includes one or more devices capable of communicating with base station 210 and/or a network (e.g., network 260, etc.). For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 205 may be capable of communicating using uplink (e.g., UE to base station) communications, downlink (e.g., base station to UE) communications, and/or side link (e.g., UE-to-UE) communications. In some implementations, UE 205 may include a machine-type communication (MTC) UE, such as an evolved or enhanced MTC (eMTC) UE. In some implementations, UE 205 may include an Internet of Things (IoT) UE, such as a narrowband IoT (NB-IoT) UE and/or the like. In some implementations, UE 205 may perform one or more actions described as being performed by UE 102-1. In some implementations, a set of UEs 205 (e.g., a set of multiple UEs 205, etc.) may perform one or more actions described as being performed by UEs 102.

Base station 210 includes one or more devices capable of communicating with UE 205 using a cellular Radio Access Technology (RAT). For example, base station 210 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 210 may transfer traffic between UE 205 (e.g., using a cellular RAT), other base stations 210 (e.g., using a wireless interface or a backhaul interface, such as a wired backhaul interface), and/or network 260. Base station 210 may provide one or more cells that cover geographic areas. Some base stations 210 may be mobile base stations. Some base stations 210 may be capable of communicating using multiple RATs.

In some implementations, base station 210 may perform scheduling and/or resource management for UEs 205 covered by base station 210 (e.g., UEs 205 covered by a cell provided by base station 210). In some implementations, base stations 210 may be controlled or coordinated by a network controller, which may perform load balancing, network-level configuration, and/or the like. The network controller may communicate with base stations 210 via a wireless or wireline backhaul. In some implementations, base station 210 may include a network controller, a self-organizing network (SON) module or component, or a similar module or component. In other words, a base station 210 may perform network control, scheduling, and/or network management functions (e.g., for other base stations 210 and/or for uplink, downlink, and/or side link communications of UEs 205 covered by the base station 210). In some implementations, base station 210 may include a central unit and multiple distributed units. The central unit may coordinate access control and communication with regard to the multiple distributed units. The multiple distributed units may provide UEs 205 and/or other base stations 210 with access to network 260. In some implementations, base station 210 may perform one or more actions described as being performed by base station 108.

MME 215 includes one or more devices, such as one or more server devices, capable of receiving, storing, generating, determining, and/or providing information associated with a group messaging service. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215). In some implementations, MME 215 may perform one or more actions described as being performed by AMF device 112.

SGW 220 includes one or more devices capable of routing packets. For example, SGW 220 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network and may send the aggregated traffic to network 260 (e.g., via PGW 225) and/or other network devices associated with the EPC and/or the IMS core. SGW 220 may also receive traffic from network 260 and/or other network devices and may send the received traffic to UE 205 via base station 210. Additionally, or alternatively, SGW 220 may perform operations associated with handing off UE 205 to and/or from an LTE network. In some implementations, SGW 220 may perform one or more actions described as being performed by a session management function (SMF) device.

PGW 225 includes one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 225 may aggregate traffic received from one or more SGWs 220 and may send the aggregated traffic to network 260. Additionally, or alternatively, PGW 225 may receive traffic from network 260, and may send the traffic to UE 205 via SGW 220 and base station 210. PGW 225 may record data usage information (e.g., byte usage), and may provide the data usage information to AAA 250. In some implementations, PGW 225 may perform one or more actions described as being performed by the SMF device.

PCRF 230 includes one or more network devices or other types of communication devices. PCRF 230 may store subscriber information, such as voice call and data rate plans or quotas for subscribers. In some cases, PCRF 230 may store, as part of the subscriber information, a particular identifier that is used to identify a user as being eligible to receive expanded data usage permissions. PCRF 230 may provide network control regarding service data flow detection, gating, Quality of Service (QoS), and/or flow-based charging. Policies and rules regarding QoS may include policies and rules instructing UE 205 and/or network elements (base station 210, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 230 may provide policies and rules to other network devices, such as base station 210, SGW 220, PGW 225, and/or the like, to implement network control. PCRF 230 may determine how a certain service data flow shall be treated and may ensure that subscriber plane traffic mapping and QoS is in accordance with a subscriber's profile and/or network policies. In some implementations, PCRF 230 may perform one or more actions described herein as being performed by a policy control function (PCF) device.

OSS/BSS 235 includes one or more devices capable of receiving, storing, generating, determining, and/or providing information associated with a group messaging service. For example, OSS/BSS 235 may include a server device or a group of server devices. In some implementations, OSS/BSS 235 may perform one or more actions described herein as being performed by provisioning system 104.

SCEF 240 includes one or more devices receiving, storing, generating, determining, and/or providing information associated with a group messaging service. For example, SCEF 240 may include a server device or a group of server devices. In some implementations, SCEF 240 may perform one or more actions described herein as being performed by a network exposure function (NEF) device 112 and/or a network repository function (NRF) device 114.

HSS 245 includes one or more devices, such as one or more server devices, capable of managing (e.g., receiving, generating, storing, processing, and/or providing) information associated with UE 205. For example, HSS 245 may manage subscription information associated with UE 205, such as information that identifies a subscriber profile of a user associated with UE 205 (e.g., which may include a particular identifier that identifies a user as eligible for expanded data usage permissions), information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HS S 245 may provide this information to one or more other devices of environment 200 to support the operations performed by those devices. In some implementations, HSS 245 may serve as a single, virtual data store with a centralized administration, management, and/or reporting. In some implementations, HSS 245 may perform one or more actions described herein as being performed by a unified data management (UDM) device 106.

AAA 250 includes one or more devices, such as one or more server devices, that perform authentication, authorization, and/or accounting operations for communication sessions associated with UE 205. For example, AAA 250 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations. In some implementations, AAA 250 may perform one or more actions described herein as being performed by UDM device 106.

Multicast system 255 includes one or more devices capable of receiving, generating, storing, processing, and/or providing information associated with a multicast service. In some implementations, multicast system 255 may include eMBMS-GW 255-1, BMSC 255-2, and/or BVPS 255-3. In some implementations, multicast system 255 may perform one or more actions described herein as being performed by access and mobility management function (AMF) device 110-1.

eMBMS-GW 255-1 includes one or more devices capable of routing packets to a multicast session (e.g., a multicast stream, a multicast download session, etc.). For example, eMBMS-GW 255-1 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, eMBMS-GW 255-1 may receive traffic from network 260 and/or other network devices and may send the received traffic to UE 205 via base station 210. In some implementations, eMBMS-GW 255-1 may use a multicast session to transmit a group message or a storage identifier to a location of the group message to a service area.

BMSC 255-2 includes one or more devices capable of receiving, generating, storing, processing, and/or providing information associated with a multicast service. For example, BMSC 255-2 may include a server device, a traffic transfer device (e.g., a router, a switch, a hub, etc.), or a similar device. In some implementations, BMSC 255-2 may allocate bandwidth for providing a multicast service, and/or may instruct other devices associated with providing the multicast service.

BVPS 255-3 includes one or more devices capable of receiving, generating, storing, processing, and/or providing information associated with providing a multicast service. For example, BVPS 255-3 may include a server device, a traffic transfer device (e.g., a router, a switch, a hub, etc.), or a similar device. In some implementations, BVPS 255-3 may provision an eMBMS (e.g., eMBMS-GW 255-1). In some implementations, BVPS 255-3 may create multicast services. In some implementations, BVPS 255-3 may use multicast session instructions to obtain a group message from a content server.

Network 260 includes one or more wired and/or wireless networks. For example, network 260 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
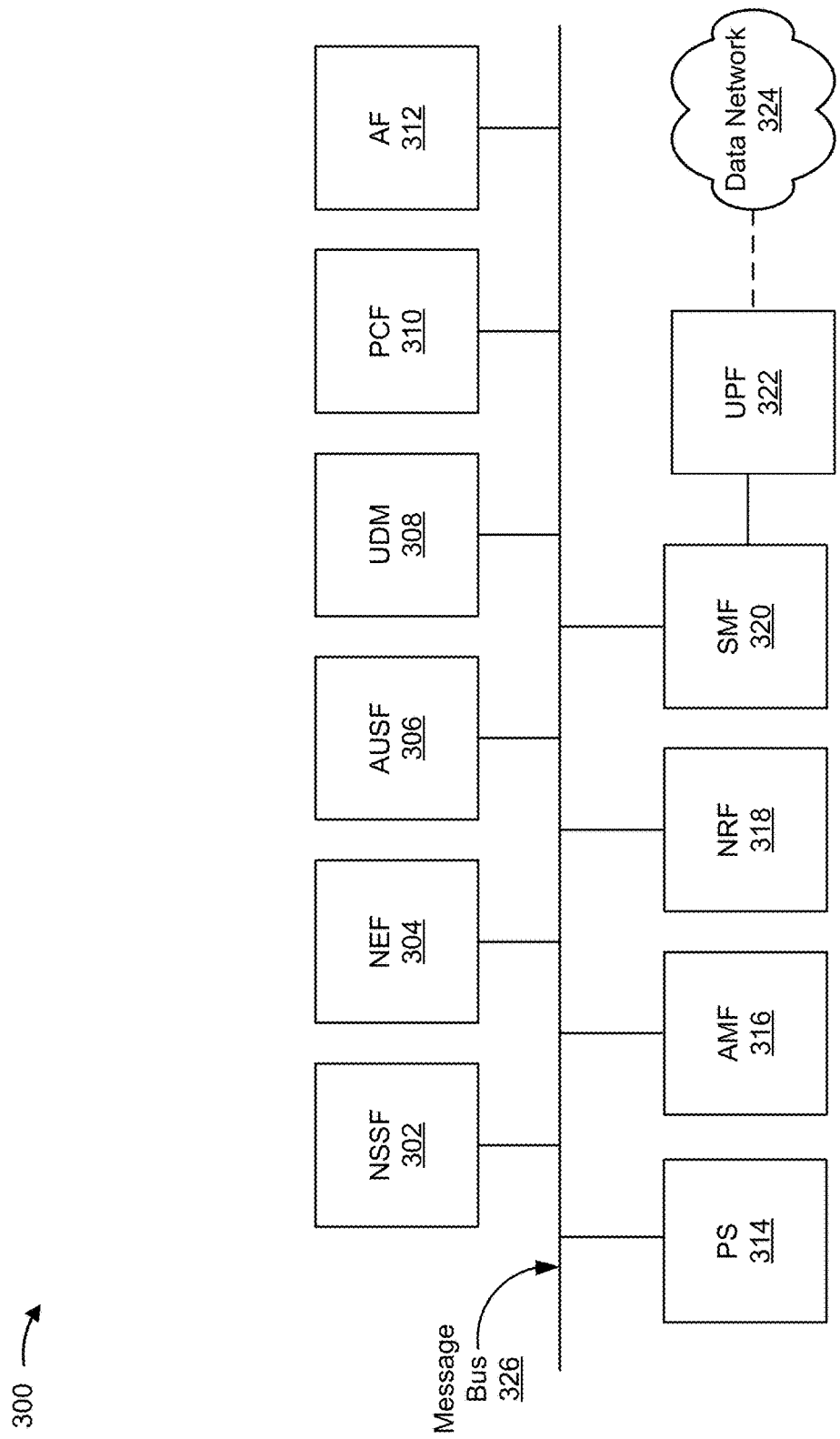
FIG. 3 is a diagram of an example functional architecture of an example core network described herein.

FIG. 3 is a diagram of an example functional architecture of a core network 300 in which systems and/or methods described herein may be implemented. For example, FIG. 3 may show an example architecture of a 5G NG core network included in a 5G wireless telecommunications system. In some implementations, the example architecture may be implemented by a core network (e.g., a core network using one or more devices described in FIG. 2). While the example architecture of shown in FIG. 3 may be an example of a service-based architecture (SBA), in some implementations, the example architecture may be implemented as a reference-point architecture or another type of architecture.

As shown in FIG. 3, core network 300 may include a number (quantity) of functional elements. The functional elements may include, for example, a network slice selection function (NSSF) 302, a network exposure function (NEF) 304, an authentication server function (AUSF) 306, a unified data management (UDM) 308, a policy control function (PCF) 310, an application function (AF) 312, a provisioning system (PS) 314, an access and mobility management function (AMF) 316, a network repository function (NRF) 318, a session management function (SMF) 320, a user plane function (UPF) 322, a data network 324, and/or the like. These functional elements may be communicatively connected via a message bus 326. Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 302 is a hardware-based element that may select network slice instances for UEs (and/or may determine network slice policies to be applied at a RAN). By providing network slicing, NSSF 302 allows an operator to deploy multiple substantially independent end-to-end networks potentially with the same infrastructure. In some implementations, each slice may be customized for different services. NEF 304 is a hardware-based element that may support the exposure of capabilities and/or events in the wireless telecommunications system to help other entities in the wireless telecommunications system discover network services. For example, NEF 304 may support the exposure of group messages that may be provided via a group messaging service.

AUSF 306 is a hardware-based element that may act as an authentication server and support the process of authenticating UEs in the wireless telecommunications system. UDM 308 is a hardware-based element that may store subscriber data and profiles in the wireless telecommunications system. UDM 308 may be used for fixed access, mobile access, and/or the like, in core network 300. In some implementations, UDM 308 may perform one or more actions described herein as being performed by UDM device 106. PCF 310 is a hardware-based element that may provide a policy framework that incorporates network slicing, roaming, packet processing, mobility management, and/or the like.

AF 312 is a hardware-based element that may support application influence on traffic routing, access to NEF 304, policy control, and/or the like. PS 314 is a hardware-based element that may support provisioning of messaging groups that are part of a group messaging service. AMF 316 is a hardware-based element that may act as a termination point for Non Access Stratum (NAS) signaling, mobility management, and/or the like. In some implementations, AMF 316 may perform one or more actions described herein as being performed by AMF device 110-1. NRF 318 is a hardware-based element that may interface with NEF 304 to provide AMF 316 with group messages. In some implementations, NRF 318 may perform one or more actions described herein as being performed by NRF device 114. SMF 320 is a hardware-based element that may support the establishment, modification, and release of communications sessions in the wireless telecommunications system. For example, SMF 320 may configure traffic steering policies at UPF 322, enforce UE IP address allocation and policies, and/or the like.

UPF 322 is a hardware-based element that may serve as an anchor point for intra/inter-Radio Access Technology (RAT) mobility. UPF 322 may apply rules to packets, such as rules pertaining to packet routing, traffic reporting, handling user plane QoS, and/or the like. Data network 324 may include various types of data networks, such as the Internet, a third party services network, an operator services network, a private network, a wide area network, and/or the like.

Message bus 326 represents a communication structure for communication among the functional elements. In other words, message bus 326 may permit communication between two or more functional elements.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of core network 300 may perform one or more functions described as being performed by another set of functional elements of core network 300.

Figure 4:
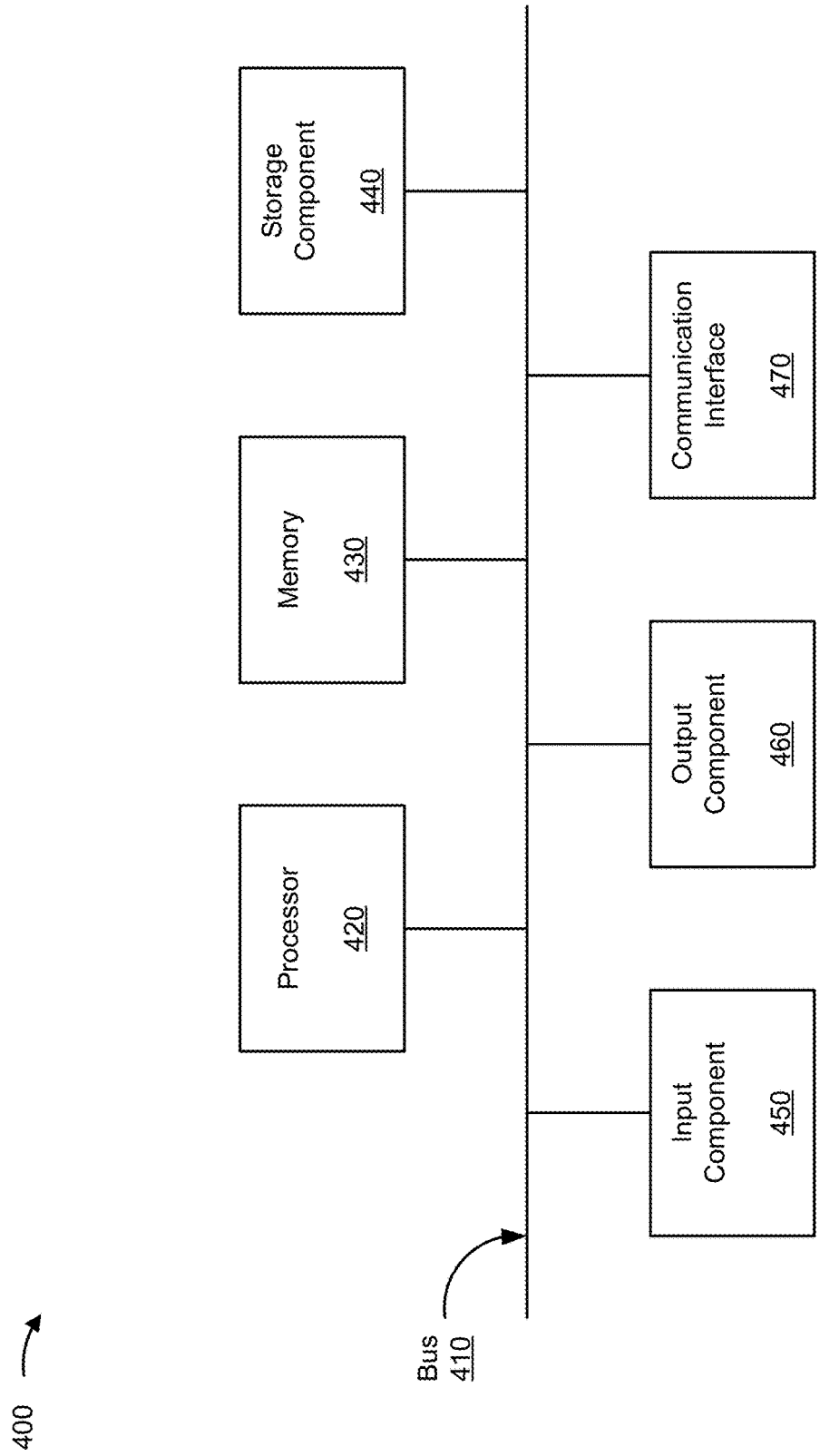
FIG. 4 is a diagram of example components of one or more devices of FIG. 2 or 3.

FIG. 4 is a diagram of example components of a device 400. In some implementations, device 400 may correspond to UE 205, base station 210, MME 215, SGW 220, PGW 225, PCRF 230, OSS/BSS 235, SCEF 240, HSS 245, AAA 250, and/or multicast system 255. In some implementations, UE 205, base station 210, MME 215, SGW 220, PGW 225, PCRF 230, OSS/BSS 235, SCEF 240, HSS 245, AAA 250, and/or multicast system 255 may include one or more devices 400 and/or one or more components of device 400. Additionally, or alternatively, device 400 may correspond to NSSF 302, NEF 304, AUSF 306, UDM 308, PCF 310, AF 312, PS 314, AMF 316, NRF 318, SMF 320, and/or UPF 322. In some implementations, NSSF 302, NEF 304, AUSF 306, UDM 308, PCF 310, AF 312, PS 314, AMF 316, NRF 318, SMF 320, and/or UPF 322 may include one or more devices 400 and/or components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 5. Additionally, or alternatively, a set of components (e.g., one or more components) of device 400 may perform one or more functions described as being performed by another set of components of device 400.

Figure 5:
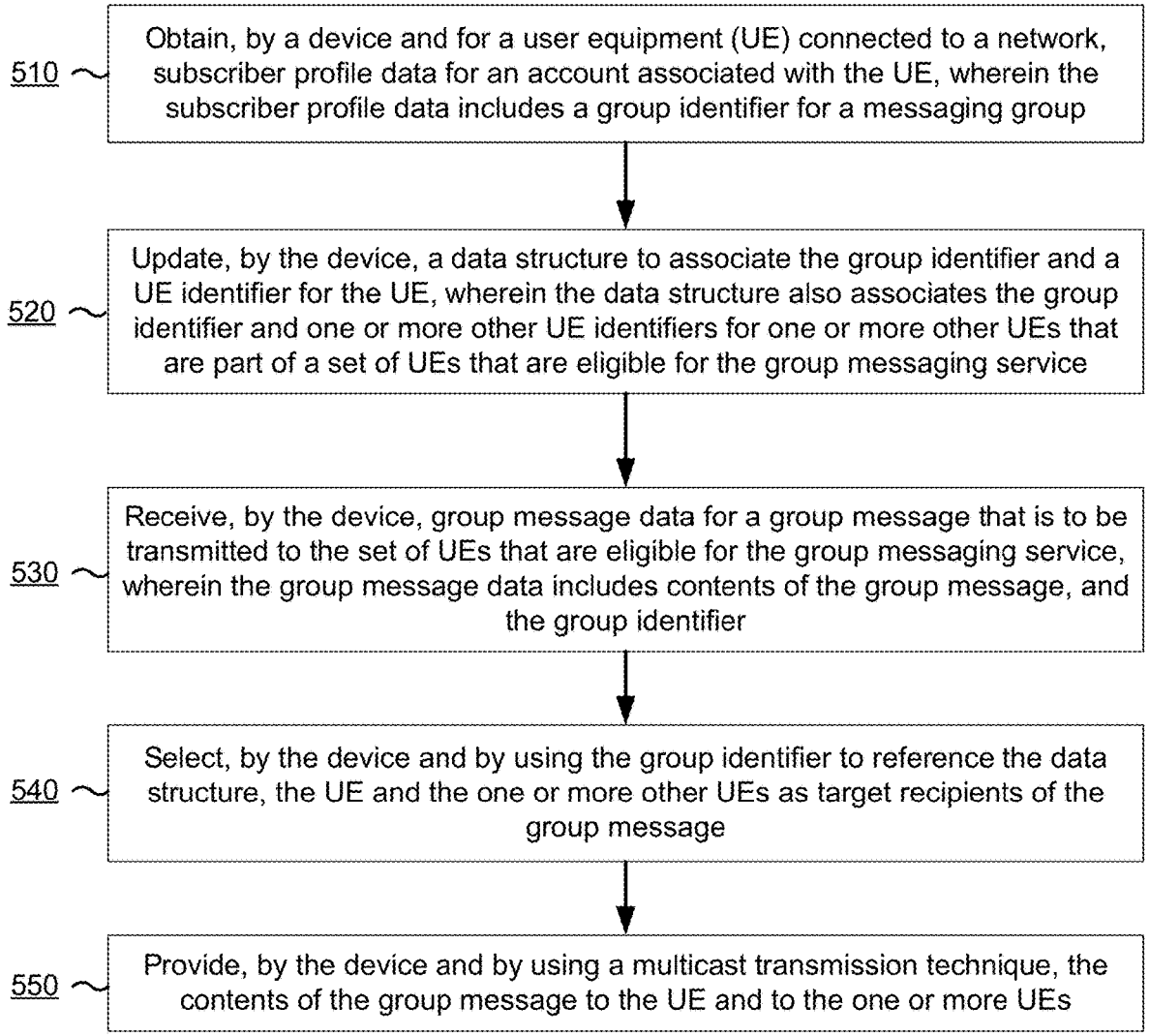
FIG. 5 is a flowchart of an example process for group message delivery using multicast.

FIG. 5 is a flow chart of an example process 500 for group message delivery using multicast. In some implementations, one or more process blocks of FIG. 5 may be performed by an access and mobility management function (AMF) device (e.g., AMF 316). In some implementations, one or more process blocks of FIG. 5 may be performed by another device or a group of devices separate from or including the AMF device, such as a user equipment (UE) (e.g., UE 205), a base station (e.g., base station 210), a provisioning system (PS) (e.g., OSS/BSS 235, PS 314, and/or the like), and/or one or more network devices (e.g., devices described in connection with FIG. 2 and/or FIG. 3).

As shown in FIG. 5, process 500 may include obtaining, by a device and for a user equipment (UE) connected to a network, subscriber profile data for an account associated with the UE, wherein the subscriber profile data includes a group identifier for a messaging group (block 510). For example, the AMF device (e.g., using processor 420, memory 430, storage component 440, input component 350, output component 460, communication interface 470, and/or the like) may obtain, for a UE connected to a network, subscriber profile data for an account associated with the UE, as described above. In some implementations, the subscriber profile data may include a group identifier for a messaging group.

In some implementations, the network may be a fifth generation (5G) network. For example, the network may be a 5G network that uses a service-based architecture (SBA) framework. In some implementations, the network may be a fourth generation (4G) network, such as a 4G long-term evolution (LTE) network. In this case, a mobility management entity (MME) (e.g., MME 215) may perform one or more actions described as being performed by the AMF device.

In some implementations, after obtaining the subscriber profile data that includes the group identifier, the AMF device may subscribe to the group messaging service via a resource that is responsible for advertising the group messages for the messaging group. For example, the AMF device may interact with a network repository function (NRF) of a resource to subscribe to the messaging group. The AMF device may interact with the NRF via an application programming interface (API) that connects to the resource and that is responsible for advertising group messages for the messaging group. In some implementations, subscribing to the messaging group may cause the resource to use the NRF to update an AMF list with an identifier of the AMF device. In some implementations, as one or more other UEs connect to the network, the AMF device may obtain subscriber profile data for accounts associated with the one or more other UEs.

As further shown in FIG. 5, process 500 may include updating, by the device, a data structure to associate the group identifier and a UE identifier for the UE, wherein the data structure also associates the group identifier and one or more other UE identifiers for one or more other UEs that are part of a set of UEs that are eligible for the group messaging service (block 520). For example, the AMF device (e.g., using processor 420, memory 430, storage component 440, and/or the like) may update a data structure to associate the group identifier and a UE identifier for the UE, as described above. In some implementations, the data structure may also associate the group identifier and one or more other UE identifiers for one or more other UEs that are part of the set of UEs that are eligible for the group messaging service.

As further shown in FIG. 5, process 500 may include receiving, by the device, group message data for a group message that is to be transmitted to the set of UEs that are eligible for the group messaging service, wherein the group message data includes contents of the group message and the group identifier (block 530). For example, the AMF device (e.g., using processor 420, memory 430, storage component 440, input component 350, communication interface 470, and/or the like) may receive group message data for a group message that is to be transmitted to the set of UEs that are eligible for the group messaging service, as described above. In some implementations, the group message data may be received based on the device being subscribed to the group messaging service.

In some implementations, such as when the network is a 5G network, the AMF device may receive the group message from a PRF device. In some implementations, such as when the network is a 4G network, an MME (instead of the AMF device) may receive the group message from a service capability exposure function (SCEF) device. The SCEF device may have received the group message from an application service.

As further shown in FIG. 5, process 500 may include selecting, by the device and by using the group identifier to reference the data structure, the UE and the one or more other UEs as target recipients of the group message (block 540). For example, the AMF device (e.g., using processor 420, memory 430, storage component 440, output component 460, communication interface 470, and/or the like) may select, by using the group identifier to reference the data structure, the UE and the one or more other UEs as target recipients of the group message, as described above.

As further shown in FIG. 5, process 500 may include providing, by the device and by using a multicast transmission technique, the contents of the group message to the UE and to the one or more UEs (block 550). For example, the AMF device (e.g., using processor 420, memory 430, storage component 440, input component 350, output component 460, communication interface 470, and/or the like) may provide, by using a multicast transmission technique, the contents of the group message to the UE and to the one or more UEs, as described above.

In some implementations, the AMF device may receive another connection request for a particular UE that is to connect to the network. In this case, the AMF device may obtain particular subscriber profile data for an account associated with the particular UE, where the particular subscriber profile data includes the group identifier for the group messaging service. Additionally, the AMF device may select the particular UE as a target recipient for the group message and may provide the contents of the group message to the particular UE.

In some implementations, the AMF device may generate, over time, multicast transmission results (e.g., group message transmission results) that indicate which of the set of UEs received the group message. In this case, the AMF device may provide the multicast transmission results for display via an interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device and for a user equipment (UE) connected to a network, subscriber profile data for an account associated with the UE,
      wherein the subscriber profile data includes a group identifier for a messaging group,
      wherein the messaging group is created by a user associated with the user equipment,
      wherein the subscriber profile data is obtained from a unified data management (UDM) device based on a connection request, and
      wherein the device includes an access and mobility management function (AMF);
   updating, by the device, a data structure to associate the group identifier and a UE identifier for the UE,
      wherein the data structure also associates the group identifier and one or more other UE identifiers that are part of a set of UEs that are eligible for a group messaging service;
   receiving, by the device and for a group message that is to be transmitted to the set of UEs, group message data includes:
      contents of the group message, and
      the group identifier,
      wherein the group message data is received from a network repository function (NRF) of a resource responsible for advertising group messages for the messaging group;
   selecting, by the device and by using the group identifier to reference the data structure, the UE and one or more other UEs, of the set of UEs, as target recipients of the group message;
   providing, by the device and by using a multicast transmission technique, the contents of the group message to the UE and to the one or more other UEs;
   generating, by the device, multicast transmission results that indicate which of the set of UEs received the group message; and
   providing, by the device, the multicast transmission results for display via an interface.

2. The method of claim 1, further comprising:
   subscribing, by the device and after obtaining the subscriber profile data that includes the group identifier for the messaging group, to the group messaging service to allow the resource to transmit the group messages to the device; and
   wherein receiving the group message data comprises:
      receiving the group message data from the resource.

3. The method of claim 1, wherein the network uses a service-based architecture (SBA).

4. The method of claim 1, wherein the group message data is received via an application programming interface (API) created for the group messaging service.

5. The method of claim 1, wherein receiving the group message data comprises:
   receiving the group message data from a service capability exposure function (SCEF).

6. The method of claim 1, further comprising:
   receiving another connection request for a particular UE that is to connect to the network;
   obtaining particular subscriber profile data for a particular account associated with the particular UE,
      wherein the particular subscriber profile data includes the group identifier for the group messaging service;
   selecting the particular UE as a target recipient for the group message based on the particular subscriber profile data including the group identifier; and
   providing the contents of the group message to the particular UE.

7. The method of claim 1, wherein generating the multicast transmission results comprises generating the multicast transmission results that have occurred over a threshold time period.

8. A device, comprising:
one or more memories; and
one or more processors, operatively coupled to the one or more memories, to:
obtain subscriber profile data for accounts associated with a set of UEs,
wherein the subscriber profile data for multiple UEs, of the set of UEs, include a group identifier for a messaging group,
wherein the messaging group is created by a user associated with user equipment of the set of UEs,
wherein the subscriber profile data is obtained from a unified data management (UDM) device based on a connection request, and
wherein the device includes an access and mobility management function (AMF);
update a data structure to associate the group identifier and UE identifiers for the multiple UEs;
receive, from a resource that is responsible for advertising group messages for the messaging group, group message data for a group message that is to be transmitted to a second set of UEs that are eligible for a group messaging service,
wherein the group message data includes at least one of:
contents of the group message, device identifiers for the second set of UEs, or the group identifier, and
wherein the group message data is received from a network repository function (NRF) of the resource;
select, by using the group identifier to reference the data structure, the multiple UEs as target recipients of the group message;
provide, by using a multicast transmission technique, the contents of the group message to the multiple UEs;
generate multicast transmission results that indicate which of the set of UEs received the group message; and
provide the multicast transmission results for display via an interface.

9. The device of claim 8, wherein the one or more processors are further to:
subscribe, after obtaining the subscriber profile data for the set of UEs, to the group messaging service, via an application programming interface (API) that connects to the resource that is responsible for advertising group messages for the messaging group; and
wherein the one or more processors, when receiving the group message data, are to:
receive the group message data from the resource via the API.

10. The device of claim 8, wherein the device includes a mobility management entity (MME); and
wherein the one or more processors, when receiving the group message data, are to:
receive the group message data from a service capability exposure function (SCEF) of the resource.

11. The device of claim 8, wherein the group message data is received via an application programming interface (API) created for the group messaging service.

12. The device of claim 8, wherein the one or more processors are further to:
receive a connection request for a particular UE that is to connect to a network;
obtain particular subscriber profile data for a particular account associated with the particular UE,
wherein the particular subscriber profile data includes the group identifier for the messaging group;
select the particular UE as a target recipient for the group message based on the particular subscriber profile data including the group identifier; and
provide the contents of the group message to the particular UE.

13. The device of claim 8, wherein the network uses a service-based architecture (SBA).

14. The device of claim 8, wherein the one or more processors, when generating the multicast transmission results, are to:
generate the multicast transmission results that have occurred over a threshold time period.

15. A non-transitory computer-readable medium storing instructions, the instructions comprising:
one or more instructions that, when executed by one or more processors, cause the one or more processors to:
obtain subscriber profile data for an account associated with a user equipment (UE) that is connected to a network,
wherein the subscriber profile data includes a group identifier for a messaging group that includes a set of UEs that are eligible to receive group messages as part of a group messaging service,
wherein the messaging group is created by a user associated with the user equipment,
wherein the subscriber profile data is obtained from a unified data management (UDM) device based on a connection request, and
wherein the device includes an access and mobility management function (AMF);
subscribe, after obtaining the subscriber profile data for the UE, to the group messaging service, by interacting with a resource that is responsible for advertising the group messages for the messaging group;
update a data structure to associate the group identifier and a UE identifier for the UE;
wherein the data structure is to be used to associate the group identifier and one or more other UE identifiers for one or more other UEs that connect to the network and that are part of the set of UEs that are eligible for the group messaging service;
receive group message data for a group message that is to be transmitted to the set of UEs that are included in the messaging group,
wherein the group message data includes at least one of: contents of the group message, device identifiers for the set of UEs, or the group identifier, and
wherein the group message data is received from a network repository function (NRF) of the resource;
select, by using the group identifier to reference the data structure, the UE and particular UEs that have connected to the network and that are part of the one or more other UEs that are eligible for the group messaging service;
provide, by using a multicast transmission technique, the contents of the group message to the UE and to the particular UEs;
generate multicast transmission results that indicate which of the set of UEs received the group message; and
provide the multicast transmission results for display via an interface.

16. The non-transitory computer-readable medium of claim 15, wherein the group message data is received from a network exposure function (NEF).

17. The non-transitory computer-readable medium of claim 15, wherein the one or more instructions, that cause the one or more processors to receive the group message data, cause the one or more processors to:
    receive the group message data from a service capability exposure function (SCEF), which received the group message data from an application service.

18. The non-transitory computer-readable medium of claim 15, wherein the one or more instructions, further cause the one or more processors to:
    receive a connection request for another UE that is to connect to the network;
    obtain particular subscriber profile data for a particular account associated with the other UE,
        wherein the particular subscriber profile data includes the group identifier for the group messaging service;
    select the other UE as a target recipient for the group message based on the particular subscriber profile data including the group identifier; and
    provide the contents of the group message to the other UE.

19. The non-transitory computer-readable medium of claim 15, wherein the group message data is received via an application programming interface (API) created for the group messaging service.

20. The non-transitory computer-readable medium of claim 15, wherein the one or more instructions, that cause the one or more processors to select to the UE and the particular UEs, cause the one or more processors to:
    use the UE identifier for the UE and particular UE identifiers for the particular UEs to search the data structure to determine that a corresponding UE identifier and corresponding particular UE identifiers are stored in association with the group identifier, and
    select the UE and the particular UEs based on determining that the corresponding UE identifier and corresponding particular UE identifiers are stored in association with the group identifier.

* * * * *